United States Patent [19]
Kanai et al.

[11] 3,987,488
[45] Oct. 19, 1976

[54] MULTI-TRACKS MAGNETIC HEAD WITH SINGLE TURN WINDING STRUCTURE

[75] Inventors: Kenji Kanai, Neyagawa; Fukashi Kobayashi; Hiroshi Taniguchi, both of Hirakata, all of Japan

[73] Assignee: Matsushita Electric Industrial Co., Ltd., Osaka, Japan

[22] Filed: June 2, 1975

[21] Appl. No.: 582,825

[30] Foreign Application Priority Data
June 5, 1974 Japan.............................. 49-64467
June 5, 1974 Japan.............................. 49-64469
June 5, 1974 Japan.............................. 49-64470
June 5, 1974 Japan.............................. 49-64471
June 5, 1974 Japan.............................. 49-64472

[52] U.S. Cl.............................. 360/123; 360/66; 360/121
[51] Int. Cl.². ............... G11B 5/20; G11B 5/47; G11B 5/28
[58] Field of Search...................... 360/123, 121, 66

[56] References Cited
UNITED STATES PATENTS
3,829,896 8/1974 Brock et al. ...................... 360/123

Primary Examiner—Robert S. Tupper
Attorney, Agent, or Firm—Wenderoth, Lind & Ponack

[57] ABSTRACT

A multi-tracks magnetic head has a first conductor utilized as the bias winding, and a second conductor as the winding for the signal to be recorded. Only the first conductors of the respective unit magnetic heads are connected in series.

By making use of the multi-track magnetic head constructed in this way, electrical power consumption by the amplifiers supplying the recording currents to drive all the composing unit magnetic heads is minimized, and the magnetic cross-talk between the unit magnetic heads is reduced.

6 Claims, 16 Drawing Figures

MULTI-TRACKS MAGNETIC HEAD WITH SINGLE TURN WINDING STRUCTURE

BACKGROUND OF THE INVENTION

1. Field of the Invention

This invention relates to a magnetic head, and more particularly pertains to a mutli-track magnetic head.

2. Description of the Prior Art

In order to store information on a medium by means of magnetic recording techniques, the recording current supplied to the magnetic head windings is required to magnetize the medium. Whether the method of bias recording or non-bias recording is used, in the case of a multi-track magnetic head having a large number of unit magnetic heads, the electrical power required to energize those heads simultaneously will be quite large.

FIG. 1 shows a multi-track magnetic head 1 in which a large number of unit magnetic heads 2 are assembled, and packed in a casing. In order to record the signal on the magnetic recording medium 3 by letting the recording current simultaneously flow in all the unit recording heads with track numbers from $T_1$ to $T_n$, when the corresponding recording amplifiers 5 numbered $A_1$ to $A_n$ are electrically connected to the unit magnetic heads 2 numbered $T_1$ to $T_n$, and a part or all of the recording amplifiers 5 are put together as an assembly 4, the power consumption by the recording amplifiers is large, if the number of the unit magnetic heads is large, and consequently, the problem of radiation and the problem of heat resistance to heat of the semiconductors themselves which compose the amplifier 5 occurs. In reference to the signal source of FIG. 1, the signal from the input terminal 7 is divided by the divider 6, and is, then, fed to the respective recording amplifiers 5. The input signal source is not limited to this arrangement, and the input signals may be fed from a series of sources.

When the no-bias recording method is used, a rather large electric power capacity is required for individual recording amplifiers 5 shown in FIG. 1; accordingly, the amount electric power required as a whole is very large. Generally, recording amplifiers, covering wide frequency bands are necessary for this arrangement. The use of a large number of high output recording amplifiers is uneconomical. On the other hand, when the bias recording method is used, if bias supplying amplifiers for mono frequency are available, only signal recording amplifiers having small capacities are needed, and accordingly, the power consumption of the assembly 4 of the recording amplifiers can be reduced.

The basic composition of a conventional bias recording system is as shown in FIG. 2. To the winding 9 wound on the magnetic head core 8, the bias frequency $f$ B is fed from the bias amplifier 12 through the high-pass filter or the band pass filter 10, and the signal $f$ S from the recording amplifier 13 is fed through the low-pass filter 11. In order to simultaneously drive a large number of unit magnetic heads of such a construction, they are parallel-connected to the bias power supply, so that the bias may be supplied from a single terminal 14 through the filters 10. As described above, for each unit magnetic head, two filters mainly composed of inductive windings and condensers are necessary. In the multi-track magnetic head in which the number of the unit magnetic heads used is large, the number of these filters and the mutual interactions between these filters pose problems. Furthermore, when these magnetic heads and recording amplifiers are to be formed in integrated circuits by the techniques of vapor deposition or photoetching, the capacitors, etc., of the filters cause difficulties in making such unit heads.

BRIEF SUMMARY OF THE INVENTION

Object of the Invention

It is an object of the invention to provide a multi-track magnetic head which is quite effective for reducing electrical power consumption of amplifiers supplying recording currents.

Another object of the invention is to provide a multi-track magnetic head in which magnetic cross-talk between the unit magnetic heads is reduced.

Those objects are achieved by a multi-track magnetic head of this invention comprising first and second conductors surrounded by magnetic materials and arranged to include a gap region in each unit magnetic head of the multi-track magnetic head, with only the first conductors of the respective unit magnetic heads being connected in series.

Other objects and features of this invention will become more apparent from the following detailed description.

DETAILED DESCRIPTION OF PREFERRED EMBODIMENTS

Figure 1:
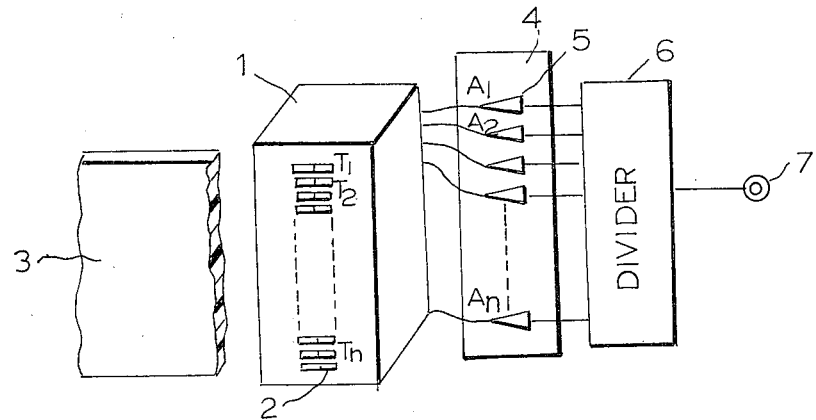
FIG. 1 is a diagram for explanation of the conventional multi-track magnetic head and amplifier system for recording current.
Figure 2:
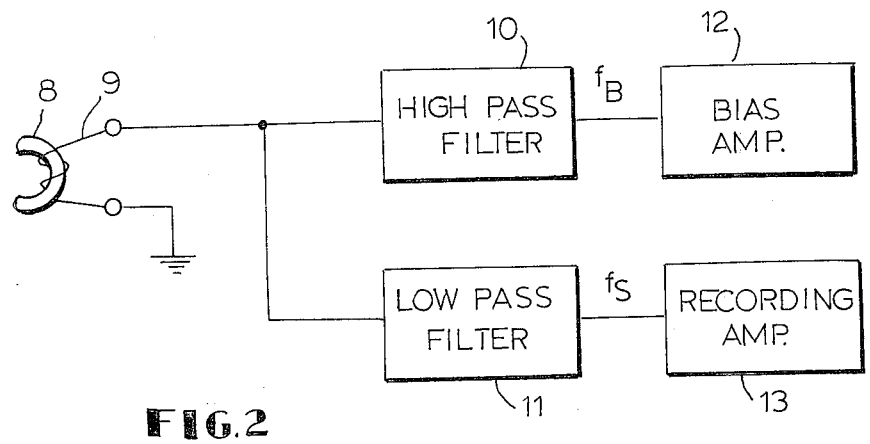
FIG. 2 is a block connection diagram of the conventional magnetic head and electric system for use in bias recording.
Figure 3:
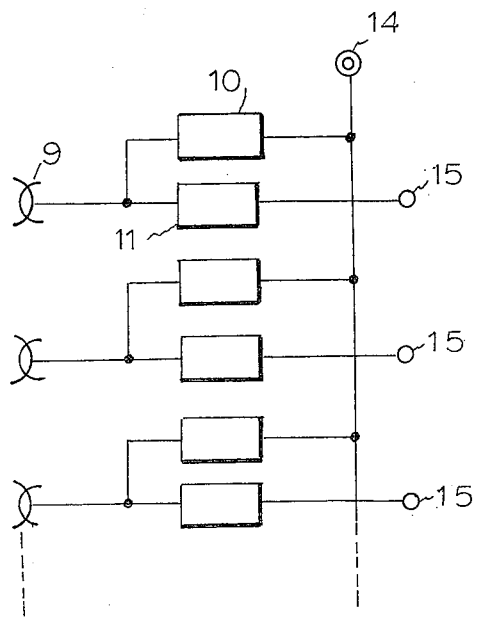
FIG. 3 is a wire connection diagram for use in bias recording with a large number of magnetic heads arranged in the conventional manner.
Figure 4:
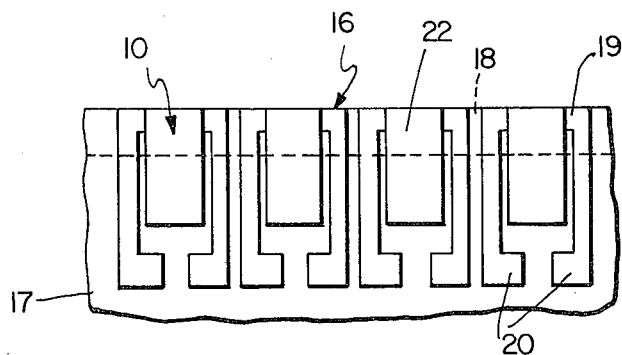
FIG. 4 is a partly enlarged plan view of the magnetic head using a two conductor system of this invention.
Figure 5:
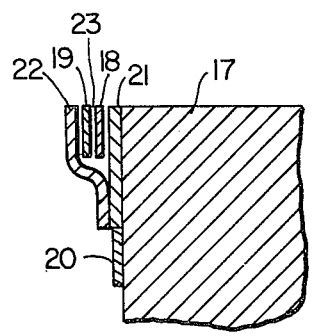
FIG. 5 is a sectional view of the head of FIG. 4.
Figure 6:
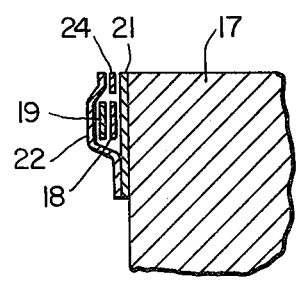
FIG. 6 is a sectional view of another embodiment of a head according to the invention.

Referring first to the embodiment of the invention shown in FIG. 4, the unit magnetic heads 10 are arranged in a single row of the substrate 17; the first conductors 18 of the respective unit magnetic heads are connected in series; the second conductors 19 are independently installed on the respective unit magnetic heads, with their terminals extending rearwardly from the face of the unit magnetic head, and that conductors 18 and 19 are separated by a gap region 23 and are surrounded by the first magnetic layer 21 and the second magnetic layer 22. In FIG. 5, a sectional view of this construction is shown. In this construction, on the non-magnetic substrate 17 of glass, silicon, etc., a magnetic film 21 of permalloy, sendust, ferrite, etc., is coated by way of vapor deposition, plating, etc., and then, formed by the photoetching techniques, etc., as required, only the first magnetic layer 21 the first conductor 18 is coated by way of vapor deposition, plating or by a photoetching technique, etc., parallel to the track width direction of the unit magnetic head, and, if required, an insulator layer (not shown) such as silicon oxide (SiO) or silicon dioxide ($SiO_2$), etc., is provided between magnetic layer 21 and conductor 18. Over this conductor or at a shifted position in the same plane, a second conductor layer 19 is similarly coated with an intermediate insulator layer (not shown), and again, after provision of an intermediate insulator layer (not shown), the second magnetic layer 22 is similarly coated over the first magnetic layer 21. The gap region with a narrow gap width can be provided, as required, by inserting a non-magnetic gap material 24 between the magnetic layers 21 and 22, as shown in FIG. 6. The first conductors 18 of the respective unit magnetic heads 16 are connected is series a common conductor, while the second conductors are independently provided for each unit magnetic head, as shown in FIG. 4, and each of them has a terminal 20. The surface which is to move relative to the recording medium in parallel thereto is so formed as to be contained in a plane parallel to the first conductor.

Figure 7:
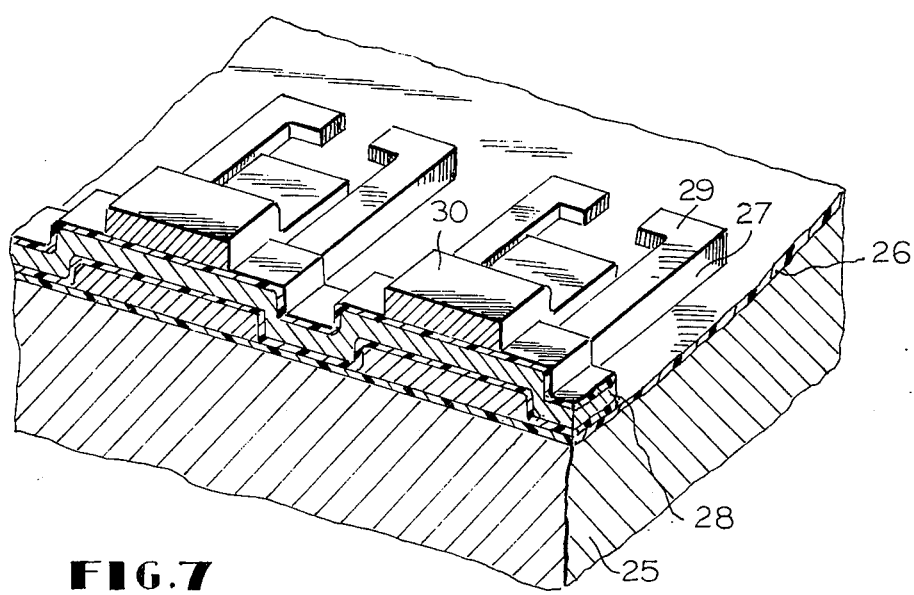
FIG. 7 is an enlarged perspective view, partly in section, of the essential part of the multi-track magnetic head using the two conductor system of this invention.

FIG. 7 shows a section of a magnetic head, taken just under the recording medium contacting surface, in which similar unit magnetic heads are formed on a magnetic substrate 25. When the substrate is conductive, the second conductors 27 are formed on an insulator layer 26, but when the substrate is non-conductive, the conductors 27 can be formed directly on the substrate, or if necessary, on an intermediate layer. The second conductors 27 are formed by vapor deposition or plating or by a photoetching technique and have terminals 29. Then, over an intermediate insulator layer, the first conductor 28 is formed as the common conductor of the respective unit magnetic heads. Again over an intermediate insulator layer, the magnetic layer 30 is similarly coated and in the direction of the track width it has a dimension corresponding to the track width of the unit magnetic head. The sequence of forming the 1st and the 2nd conductors may be altered.

Figure 8A:
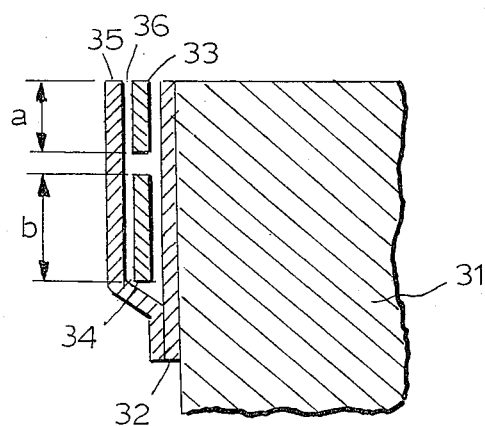
FIGS. 8a, 8b, and 8c are sectional views showing different sectional areas of the first and second conductors.
Figure 8B:
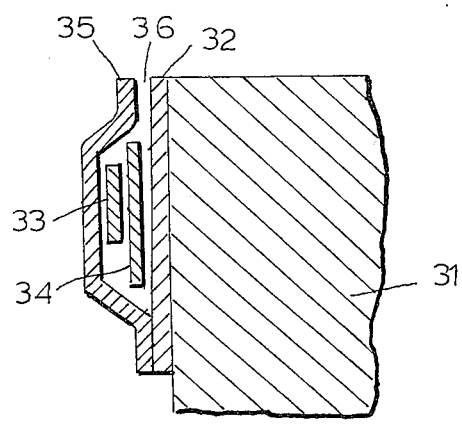
Figure 8C:
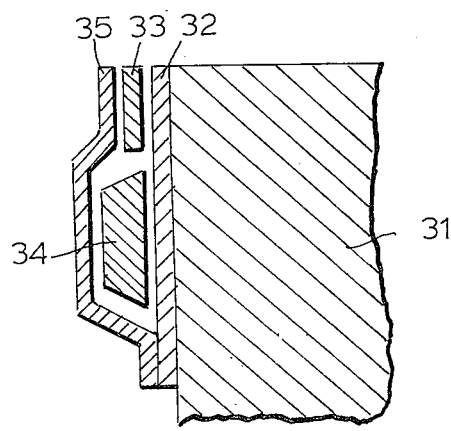

In the bias recording system, as in the magnetic head of the two conductor system of this invention, in which the first and the second conductors are electrically separated, with the bias current caused to flow in the one, and the signal current in the other, the bias current is larger than the signal current, and accordingly, a much larger current capacity is required for the bias current conductor. For this reason, the first and the second conductors are designed to have different cross sectional areas, the one with larger cross sectional area being used for the bias current. One concrete example is shown in FIGS. 8a–8c 31, the first magnetic layer 32 is coated; over this layer, the first conductor 34 is coated parallel to the track width direction, and then, the second conductor 33 with a sectional area smaller than that of the first conductor 34 is coated parallel thereto. Actual methods for altering the sectional area of the conductors include the method of arranging the conductors in a common plane with their widths differing in FIGS. 8a and 8b. FIG. 8a has the conductors arranged such that the first conductors are located at a position farther from the head faces to be contacted with the medium than that of the second conductors. FIG. 8b has the conductors stacked in two layers with their widths differing and the first and the second conductors being surrounded by magnetic layers of the unit magnetic heads at the outsides of the acting gap regions of the unit magnetic heads. They can also be arranged in parallel, with the width and thickness thereof both differing and with the second conductors 33 located in the gap regions, and the first conductors 34 located at positions farther from the head faces than that of the second conductors, as shown in FIG. 8c. Over these conductors is coated the second magnetic layer the gap region 36 being provided between them. By making use of such a structure, it is possible to obtain a unit magnetic head which will let flow a larger bias current which occurs during the recording mode, and also to provide a magnetic head which permits easy simultaneous driving of all track of the multi-tracks magnetic head.

Figure 9:
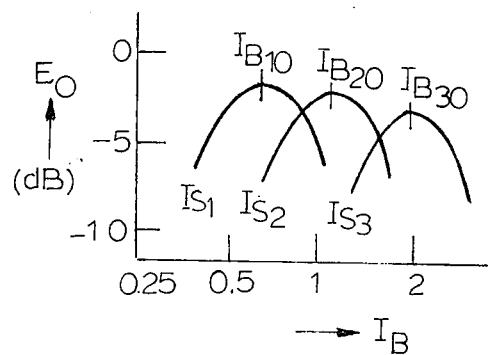
FIG. 9 is a graph showing the bias current characteristics for various signal currents; parameter.
Figure 10:
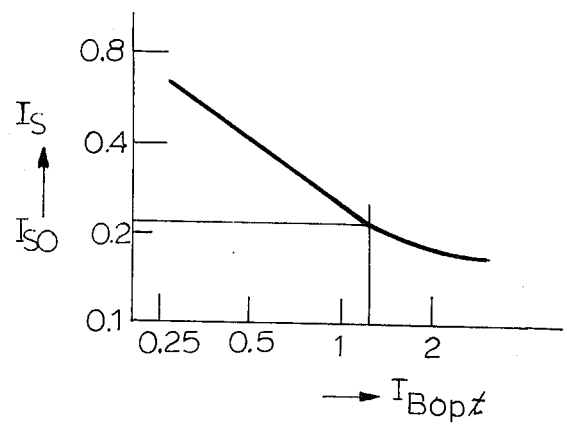
FIG. 10 is a graph showing the value of signal current vs. the value of optimum bias current.

With regard to the relationship between the bias current $I_B$ and the reproduced output $E_o$ in the saturation bias recording method, an optimum value of bias current which gives the maximum output, but involves the minimum distortion in the reproduced output, exists, if the signal current $I_s$ is constant. Although affected by the thickness of the recording medium and the magnetic characteristics, there is a tendency that as the level of the signal current is reduced, such as for $I_{s1}$, $I_{s2}$ and $I_{s3}$, the optimum value of bias current grows to $I_{B10}$, $I_{B20}$ and $I_{B30}$, respectively, as shown in FIG. 9. The relationship between the signal level and the optimum bias current $I_{Bopt}$ which gives the maximum reproduced output at that signal level undergoes a change, as shown in FIG. 10. The ratio $I_{BO}/I_{SO}$ at which this change levels off, while maintaining the maximum value of reproduced output, is about 5. Thus, if the value of the bias current is set so as to be more than ve times the value of the signal current, the value of the signal current can be reduced so as to be within a range where only a slight reduction of the maximum reproduced output occurs in the saturation bias recording for the signal current applied to the magnetic head shown in FIG. 4. This is quite effective for reducing the power supplied to the amplifier system, when simultaneously driving the multi-track magnetic head. Therefore, in the embodiments as shown in FIGS. 8a–8c, it is desirable to make the cross-sectional areas of the first conductors 34 more than five times the cross-sectional areas of second conductors 33.

Figure 11:
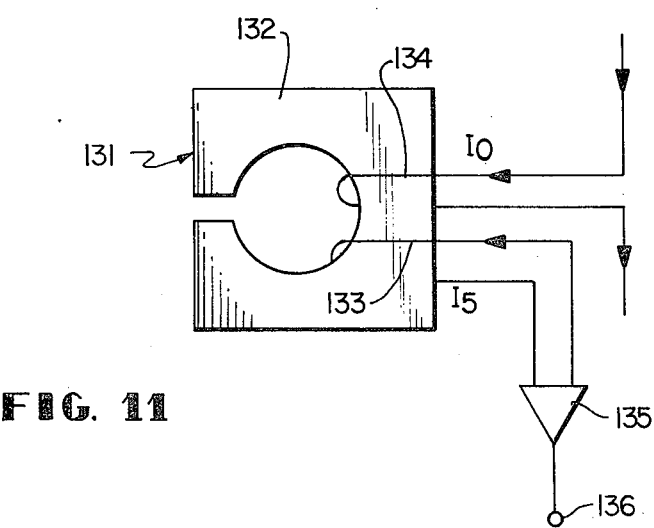
FIGS. 11 and 12 are wire connection diagrams for supplying the bias current and signal current to each unit magnetic head.
Figure 12:
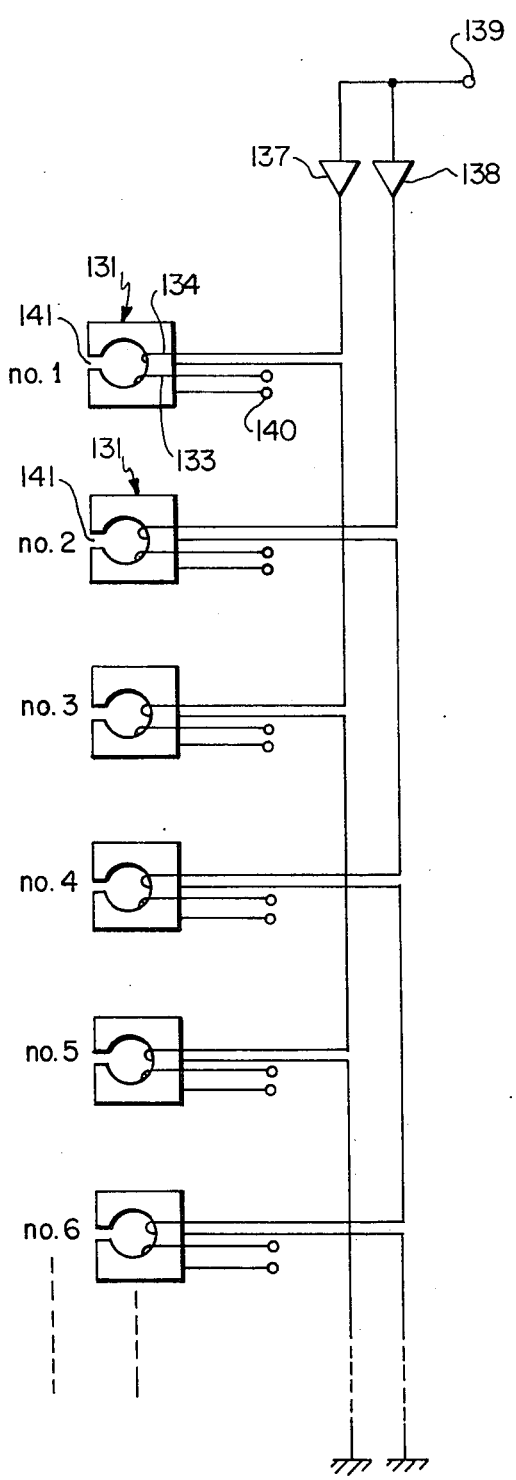

An actual arrangement for minimizing the crosstalk between adjacent tracks during the recording mode is described hereinafter:

The first conductors of only certain of the magnetic heads separated by a given number of heads are connected in a first series, other in between heads of the first series are connected in a second series, etc., so that a plurality of systems are formed, each connected by a common first conductor. An actual arrangement using the system of driving the multi-track magnetic head in which the bias current is caused to flow in separate systems, while the signal current corresponding to each unit magnetic head is caused to flow individually to each second conductor, is shown in FIGS. 11 and 12.

These diagrams illustrate an arrangement with the unit magnetic heads alternately connected to a common first conductor, that is, a two series system. As shown in FIG. 11, the unit magnetic head 131 consists of magnetic core 132, the second conductor 133 being the signal winding and the first conductor 134 being the bias winding. The signal to be recorded is supplied to the second conductor 133 from the terminal 136 through the amplifier system 135. In the magnetic head of FIG. 12, the bias windings of the unit magnetic heads located at odd numbered positions are connected in series, and the bias is applied to these unit magnetic heads through the bias amplifier 137. On the other hand, the bias windings of the unit magnetic heads located at the even numbered positions are connected in series in another system and the bias is applied through the bias amplifier 138. It is also feasible to provide a common terminal 139 for the bias signal source. The signal corresponding to each unit magnetic head is individually supplied to the signal winding of each unit magnetic head through respective terminals 140.

Figure 13:
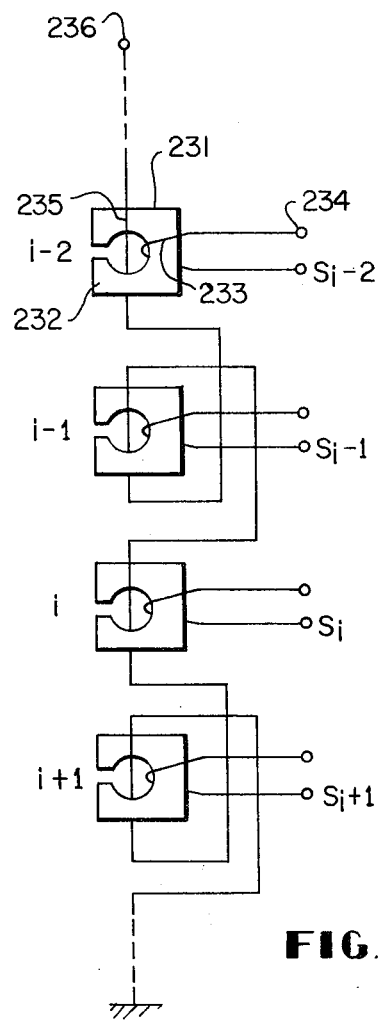
FIGS. 13 and 14 are diagrams for explanation of the direction of the magnetic field in the gap region of each unit magnetic head.
Figure 14:
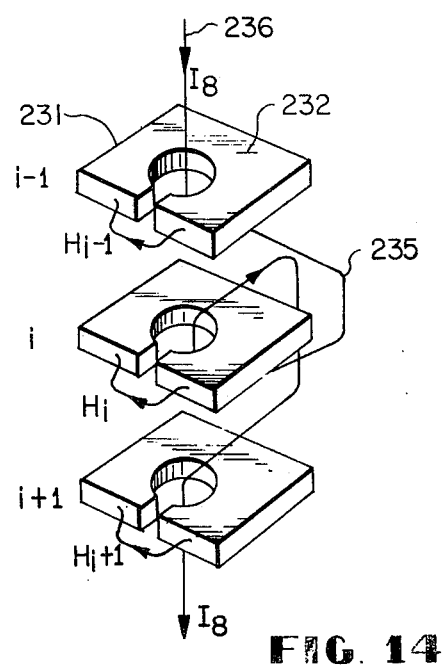

Another arrangement for minimizing the cross-talk between neighboring tracks during the recording mode is described hereinafter:

In the case of the connections in series for only the the first conductors of the unit magnetic heads which constitute the above-described multi-track magnetic head are connected in series in such a way that the directions of the magnetic fields in the gap regions of adjacent unit magnetic heads are opposite to one another. The arrangement shown in FIGS. 13 and 14 is an exmaple. In applying the signal current from the terminal 234 of the second conductor 233 as the signal winding on the magnetic core 232 of the unit magnetic head 231, and applying the bias current to the first conductors 235 connected in series, the arrangement is made in such a way that opposite directional bias currents are caused to flow in each of the adjacent magnetic heads, as shown in FIG. 13. Thus, the bias current flows downward in the drawing for the currents $i - 2, i, \ldots$, but upward for the currents $i - 1, \ldots$ . FIG. 14 indicates how the leakage from the unit magnetic head occurs as to merely the bias magnetic field. Thus, the direction of the magnetic field Hi - 1, in the $i$ - 1th unit head and that of the magnetic field Hi, in $i$ the unit head are opposite to one another.

By making use of such arrangements as described hereinbefore, the power requirements of the amplifier system may be reduced for simultaneously driving all the tracks of the multi-track magnetic head, and the use of filters, etc., for bias recording is obviated. Accordingly, highly efficient and very small multi-tracks magnetic heads can be made.

In solving the problem of cross-talk between neighboring tracks during recording mode, the arrangement of FIG. 12 very much reduces the interaction between the unit magnetic heads of the multi-track magnetic head. Especially, if the phases of the bias amplifiers 137, 138 differ by 180° from one another, the phases of the magnetic fields of the leakage from the gap regions of adjacent magnetic heads are opposite to one another, making it possible to make magnetic heads which have reduced cross-talk between heads. The distance between the unit magnetic heads may be made very small. Moreover, the bias amplifiers may be divided into a small group of small sized amplifiers, and like effects can be achieved. By making use of the arrangement of FIGS. 13 and 14, the interaction between the unit magnetic heads of the multi-track magnetic head is greatly reduced, permitting the distance between the unit magnetic heads to be very small. Because the bias current may be supplied from the common terminal 236, as shown in FIG. 13, the driving of the multi-track magnetic head can be by means of a single bias amplifier.

What we claim is:

1. A multi-track magnetic head comprised of a plurality of unit magnetic heads, each unit magnetic head comprising:
   a first generally plane magnetic layer;
   a second magnetic layer, one end of which is magnetically connected to said first magnetic layer and the other end of which is spaced from said first magnetic layer to leave a gap between said first and second magnetic layers;
   a first conductor for use as a bias winding, only said first conductors of the respective unit magnetic heads being connected in series;
   a source of bias voltage coupled to said series connected first conductors;
   a second conductor for use as a signal winding;
   a source of signal currents coupled to said second conductors;
   said first and second conductors being stacked one on the other and being positioned parallel to the track width direction of the unit magnetic head in the gap between said first and second magnetic layers; and
   an insulating layer between said conductors.

2. A multi-track magnetic head according to claim 1 wherein the cross-sectional area of the first conductor is larger than that of the seeond conductor.

3. A multi-track magnetic head according to claim 1 wherein the cross-sectional area of the first conductor is greater than five times the cross-sectional area of the second conductor.

4. A multi-track magnetic head according to claim 1 wherein the first and the second conductors are surrounded by magnetic layers of the unit magnetic heads outside of the acting gap region of the unit magnetic heads.

5. A multi-track magnetic head comprised of a plurality of unit magnetic heads each with magnetic head comprising:
   a first generally plane magnetic layer;
   a second magnetic layer one end of which is magnetically connected to said first magnetic layer and the other end of which is spaced from said first magnetic layer to leave a gap between said first and second magnetic layers,
   a first conductor for use as a bias winding, and being positioned parallel to the track width direction of the unit magnetic head in the gap between said first and second magnetic layer; (and)
   a second conductor for use as a signal winding and being positioned parallel to the track width direction of the unit magnetic head in the gap between said first and second magnetic layers;
   a source of signal currents coupled to said second conductor in each magnetic head;
   said first conductors in a plurality of unit magnetic heads being connected in series with the first conductors in adjacent unit magnetic heads being connected for current flow in opposite directions to one another, and a source of bias voltage coupled to said series connected first conductors, whereby the directions of the unit magnetic field in the gap regions of adjacent unit magnetic heads are opposite to one another when the current is caused to flow only in the first conductor.

6. A multi-track magnetic head system comprised of a plurality of unit magnetic heads, each unit magnetic head comprising;

a first generally plane magnetic layer;

a second magnetic layer, one end of which is magnetically connected to said first magnetic layer and the other end of which is spaced from said first magnetic layer to leave a gap between said first and second magnetic layers;

a first conductor for use as a bias winding;

a second conductor for use as a signal winding, said first and second conductors being positioned parallel to the track width direction of the unit magnetic head in the gap between said first and second magnetic layers, the first conductors of alternate unit magnetic heads in the multi-track magnetic head being connected in series to form a first series of unit magnetic heads, first conductors of the remaining unit magnetic heads being connected in series to form another series of unit magnetic heads;

bias current supply means connected to the respective series of first conductors for supplying different bias current to the respective series of first conductors neighboring magnetic heads are driven by different bias currents; and signal current means connected to the second conductors in the respective unit magnetic heads for supplying signal currents thereto.

* * * * *